(12) United States Patent
Choi

(10) Patent No.: US 7,274,509 B2
(45) Date of Patent: Sep. 25, 2007

(54) WALL ROLL-UP SCREEN

(76) Inventor: Hae-Yong Choi, Mookdong I Park Apartment #108-301, 385 Mook-dong, Jungryang-gu, Seoul-city (KR) 131-768

( * ) Notice: Subject to any disclaimer, the term of this patent is extended or adjusted under 35 U.S.C. 154(b) by 183 days.

(21) Appl. No.: 10/525,801

(22) PCT Filed: Sep. 15, 2003

(86) PCT No.: PCT/KR03/01884

§ 371 (c)(1),
(2), (4) Date: Feb. 25, 2005

(87) PCT Pub. No.: WO2004/027515

PCT Pub. Date: Apr. 1, 2004

(65) Prior Publication Data

US 2005/0243416 A1 Nov. 3, 2005

(30) Foreign Application Priority Data

Sep. 18, 2002 (KR) .................. 20-2002-0028755 U

(51) Int. Cl.
*G03B 21/56* (2006.01)
(52) U.S. Cl. ..................................... 359/460
(58) Field of Classification Search ......... 359/443, 359/450, 461; 160/168.1 R, 238, 241; 318/56
See application file for complete search history.

(56) References Cited

U.S. PATENT DOCUMENTS

| | | | | |
|---|---|---|---|---|
| 109,266 A | * | 11/1870 | Stephens | 160/241 |
| 3,313,337 A | * | 4/1967 | Bernat | 160/24 |
| 3,568,751 A | * | 3/1971 | Takahashi | 160/238 |
| 4,110,003 A | * | 8/1978 | Zinn | 359/461 |
| 5,128,644 A | * | 7/1992 | Nellessen | 335/306 |
| 5,581,401 A | | 12/1996 | Takamoto et al. | |
| 5,791,624 A | * | 8/1998 | Fedrick | 248/460 |
| 6,470,950 B2 | * | 10/2002 | Shimizu | 160/121.1 |
| 6,552,847 B2 | * | 4/2003 | Congard | 359/445 |

FOREIGN PATENT DOCUMENTS

JP 11-142974 5/1999
KR 1998-027358 8/1998

* cited by examiner

*Primary Examiner*—W. B. Perkey
*Assistant Examiner*—Robert Do
(74) *Attorney, Agent, or Firm*—Bacon & Thoams, PLLC

(57) ABSTRACT

The device relates to a wall roll-up screen of which the upper and the lower are attached with the upper short rod and the lower short rod, respectively, wherein the screen is constituted to be rolled up when not in use and to be unrolled when used, by the lower short rod; and the left and the right end of the upper short rod are mounted with steel structure of groove shaped ringscapable of coupling magnets and the left and the right end of the lower short rod are mounted with magnets to allow them to be coupled with the groove shaped rings of the left end and the right end of the upper short rod, upon rolling up the screen by the lower short rod and, if necessary, separating the magnets from the groove shape rings, thereby to obtain good portability and mobility of the screen, to prevent the screen from being twisted from side to side upon fixing the screen, and to improve aesthetic value of product.

4 Claims, 4 Drawing Sheets

(a)    (b)

WALL ROLL-UP SCREEN

TECHNICAL FIELD

The present invention relates to a track type wall roll-up screen among portable screens for projection, and more particularly, to a wall roll-up screen wherein the screen can be used and portable with ease by attaching a magnet assembly to both sides of a lower rod of the screen.

BACKGROUND ART

In a conventional wall roll-up screen as shown in FIG. 1, it is necessary to roll up the screen 10 around a lower rod like a scroll and to tie the screen with string 11 so as to reserve it, and to untie the string 11 to use the screen 10. And, when a user wishes to carry the screen, the user has to tie it with the string 11, which is troublesome. Especially, in this case, a surface of the screen where the string is tied has some wrinkles and edges of the screen can be loosish since the upper and lower rods are wrenched mutually. Besides the problems described above, the beauty of product is deteriorated in appearance.

DISCLOSURE OF INVENTION

The present invention has been made in view of the above problems, and it is an object of the present invention to provide a wall roll-up screen among portable screens for projection, especially, a wall roll-up screen wherein the screen can be used and portable with ease by attaching a magnet assembly to both sides of a lower rod of the screen.

According to the present invention for achieving the object, there is provided a wall roll-up screen wherein a screen is attached between upper and lower rods and the screen can be rolled up by the lower rod, wherein groove shaped rings processed with a magnetic material such as steel are attached on left and right ends of the upper rod of the screen and magnets is coupled on left and right ends of the lower rod of the screen, so that the screen is rolled up and then the magnets of the left and right of the lower rod are coupled with the groove shaped rings of the upper rod when the screen is carried, and the magnets and the groove shaped rings are separated when the screen is used.

Preferably, the groove shaped rings have grooves where the magnet can be coupled with the inner part of the groove shaped rings.

Preferably, separate attachment units are attached on the wall in the rear part of the upper and lower rods, and the attachment units are coupled with the upper and lower rods of the screen so that the screen is stably and fixedly attached to the wall.

Preferably, the groove shaped rings of the upper rod and the magnets of the lower rod can be exchanged in their positions.

BRIEF DESCRIPTION OF THE DRAWINGS

The above and other objects and features of the present invention will become apparent the following description of preferred embodiment of given in conjunction with the accompanying drawings, in which.

BEST MODE FOR CARRYING OUT THE INVENTION

Figure 1:
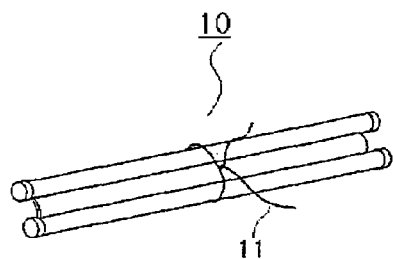
FIG. 1 is an explanatory view of a wall roll-up screen in the art.

The present invention will now be described more fully hereinafter with reference to the accompanying drawings, in which preferred embodiments of the invention are shown. This invention may, however, be embodied in different forms and should not be construed as limited to the embodiments set fourth herein. Rather, these embodiments are provided so that this disclosure will be thorough and complete, and will fully convey the scope of the invention to those skilled in the art. In the drawings, like numbers refer to like elements throughout the specification.

The screen of the present invention can be used and portable with ease by attaching a magnet assembly to both sides of a lower rod of the screen. When the screen is used, the lower rod 2 is separated from an upper rod 1 of the screen 3 to be extended. And, when the screen is carried, the screen 3 is rolled up and the upper and lower rods 1 and 2 are attached each other so that it is convenient to carry the screen without any damage on the surface of the screen and there is no distortion of the upper and lower rods of the screen in the right and left directions.

Figure 2:
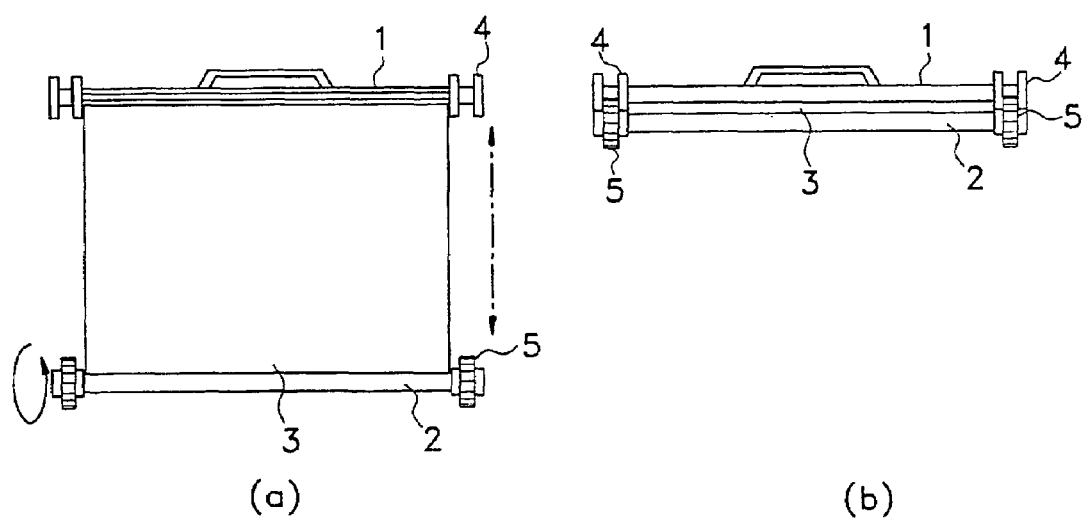
FIG. 2 is an explanatory view of an external shape of a screen in accordance with the present invention.
Figure 3:
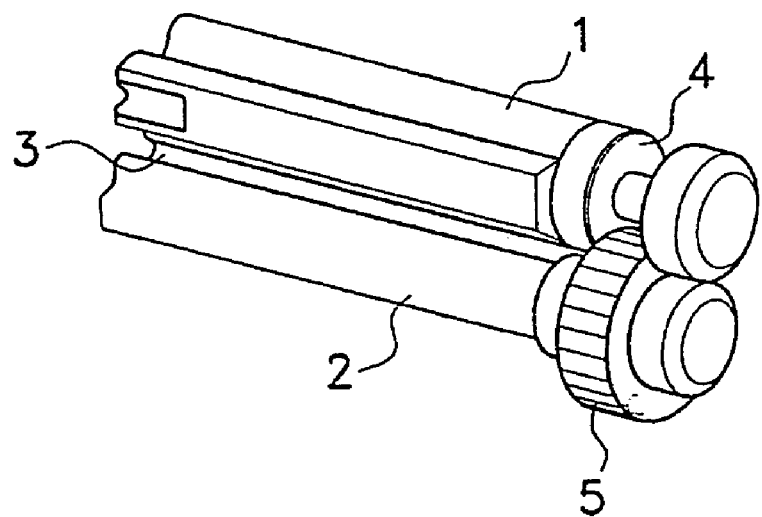
FIG. 3 is an explanatory view of a magnet of a screen in accordance with the present invention.

Referring to FIGS. 2 and 3, the present invention has the upper and lower rods 1 and 2, and the screen 3 is attached between the rods 1 and 2 so that the lower rod 2 is rolled up when the screen is moved and the rod 2 is extended when the screen is used.

Groove shaped rings 4 are attached to right and left sides of the upper rod 1, which is made of steel or the like responding to a magnetic property, and magnets 5 are attached on right and left ends of the lower rod 2.

Such a construction may be changed, that is, the groove shaped rings 4 and the magnets 5 of the upper rod 1 and the groove shaped ring 4 may be exchanged in their positions.

Figure 6:
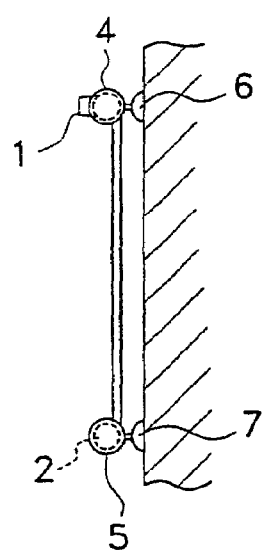
FIG. 6 is an explanatory view of a screen of the present invention when the screen is applicably used.

As shown in FIG. 6, a well known attachment unit 6 such as a rubber adsorption plate or a snap button which can be attached and separated easily may be coupled in the rear part of the upper rod 1. And, a groove shaped ring 4 is constructed in the rear part of the lower rod 2, which is separated from the lower rod 2, and there is an attachment unit 7 behind the lower rod 2.

There exist grooves into which magnets having L or U shape can be inserted in the middle of the groove shaped rings 4.

Figure 7:
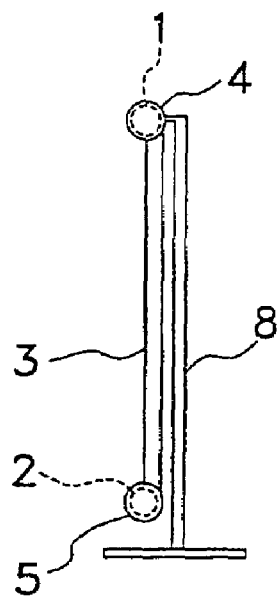
FIG. 7 is an explanatory view of a screen of the present invention when the screen is fixedly used with a stand.

Referring to FIG. 7, a known screen support 8 can be coupled and used fixedly in answer to a need, and the screen 3 may be a projection screen of roll shape.

Figure 8:
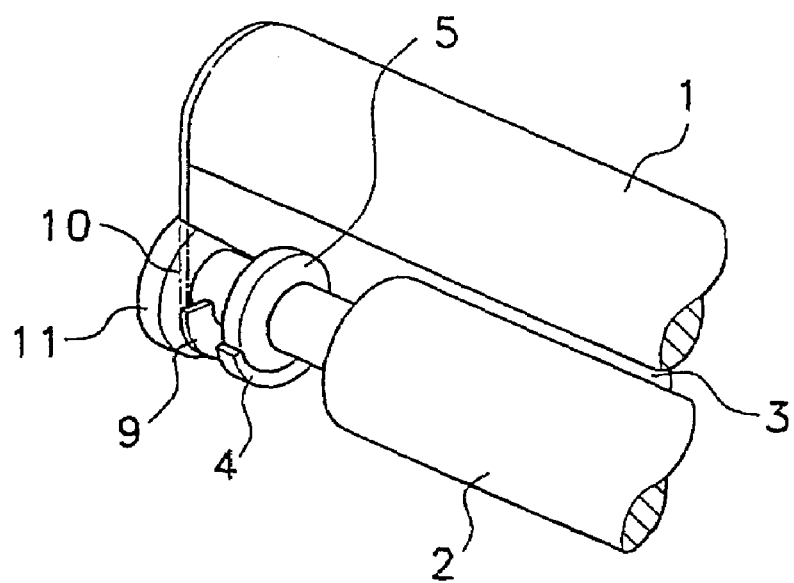
FIG. 8 is an explanatory view of a construction of a screen in accordance with the present invention when the screen is applicably used.

Referring to FIG. 8, a support 9 forming an insertion unit 10 into which the lower rod 2 is inserted is constructed on both ends of the upper rod 1, the groove shaped ring 4 formed of steel is constructed as a portion of a circle, and a handle 11 is constructed on both ends of the magnet of the lower rod 2.

The upper and lower rods 1 and 2 are extended when the screen is used, as shown in FIG. 2a. And, when the screen is portable and carried, the screen attached to the lower rod 2 is rolled up around the lower rod 2 and then the magnets 5 attached to the right and left ends of the lower rod 2 are attached to the groove shaped rings 4 formed of the steel which are attached to the right and left parts of the upper rod 1.

Figure 4:
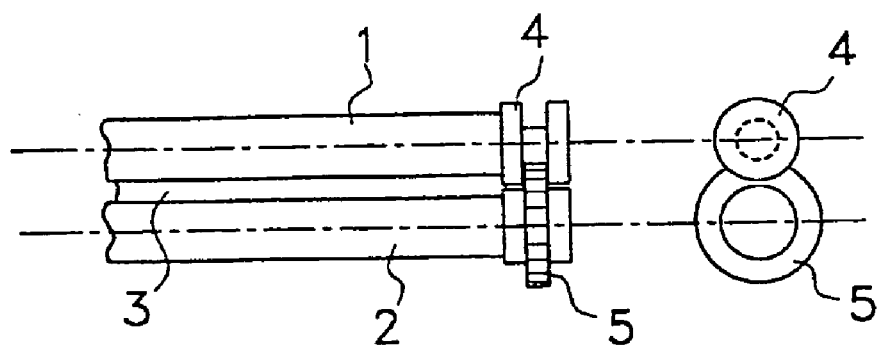
FIG. 4 is a detailed explanatory view of a magnet of a screen in accordance with the present invention.

Referring to FIG. 4, the screen of the present invention has an increased attachment effect by coupling the magnets 5 to the inner groove areas of the right and left parts of the upper rod 1.

Figure 5:
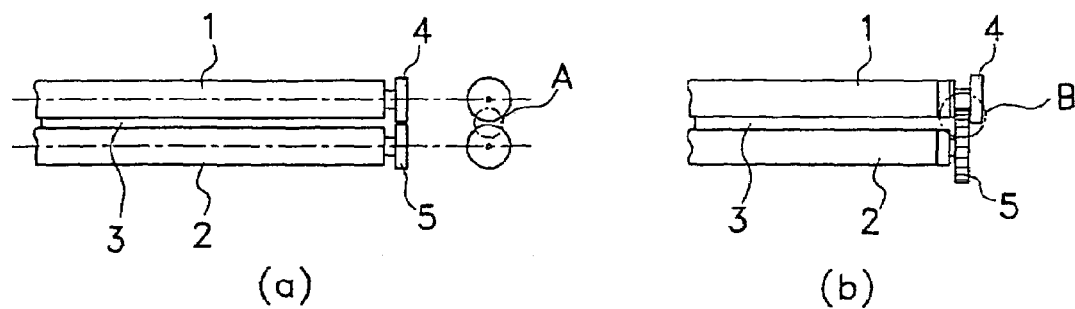
FIG. 5 is an explanatory view of a magnet contact of a screen in accordance with the present invention.

That is, as shown in FIG. 5, groove shaped rings 4 and magnets 5 on both ends of the upper and lower rods 1 and 2 of the present invention should be of circle shapes since the upper and lower rods 1 and 2 should be adhered closely each other after the screen 3 is rolled up around the lower rod 2.

In case that the grooves 4 and magnets 5 on both ends of the upper and lower rods 1 and 2 are formed of circle shape only, the coupling contact A becomes very small as shown in FIG. 5a so that the upper and lower rods 1 and 2 are easily separated with small force.

However, in case that there are grooves in the groove shaped rings 4 which can be coupled with the magnets 5 as shown in the present invention, since the coupling contact B is extended to the right and left parts of the magnets and to the front and rear parts of the groove shaped rings 4, the coupling forces of the magnets 5 and the groove shaped rings 4 can be strong. Additionally, since the magnets 5 of the lower rod 2 which are coupled with the right and left ends of the groove shaped rings 4 are not twisted in the right and left directions, the extension of the screen in its right and left parts can be protected.

Also, as shown in FIG. 6, since the screen of the present invention is conveniently installed on the wall when the attachment unit 6 is coupled with the rear part of the upper rod 1 and the upper rod is coupled with the lower rod by the magnets 5 when the lower rod 2 is rolled up, there is no damage on the screen at all.

Also, as shown in FIG. 8, the lower rod 2 which is inserted into the insertion units 10 on both ends of the upper rod 1 has magnets 5 on its groove shaped rings 4 so that there is an effect that both rods do not apart from each other, and the screen 3 of the lower rod 2 is stably rolled up to be carried when the lower rod 2 is rolled up by turning the handle 11.

INDUSTRIAL APPLICABILITY

In accordance with the present invention, it is convenient to roll up a screen itself of a front screen or a projection screen or to extend it, to maintain its beauty of appearance without tying the screen with string, to attach it to a wall or a ceil simply, to fix it in order that the screen 3 is not shaken, and to carry it stably since upper and lower rods 1 and 2 are not twisted.

When the screen of the present invention is used, the groove shaped rings 4 are attached to the attachment units 6 behind the lower rod 2 and the magnets 5 of the lower rod 2 are attached to the coupling attachment units 7 which have been attached to the coupling wall rear already so that the screen is used as portable, home and conference screens.

What is claimed is:

1. A wall roll-up screen wherein the screen is attached between upper and lower rods and the screen is configured to be rolled up by the lower rod, wherein groove shaped rings processed with a magnetic material are attached on left and right ends of the upper rod of the screen and magnets are coupled on left and right ends of the lower rod of the screen, so that the screen is rolled up and then the magnets of the left and right of the lower rod are coupled with the groove shaped rings of the upper rod when the screen is carried, and the magnets and the groove shaped rings are separated when the screen is used.

2. The screen according to claim 1, wherein the groove shaped rings have grooves where the magnets are configured to be coupled with the inner part of the groove shaped rings.

3. The screen according to claim 1, wherein separate attachment units are attached on the wall in the rear part of the upper and lower rods, and the attachment units are coupled with the upper and lower rods of the screen so that the screen is stably and fixedly attached to the wall.

4. The screen according to claim 1, wherein the groove shaped rings of the upper rod and the magnets of the lower rod are configured to be exchanged in their positions.

* * * * *